US009144047B2

(12) United States Patent
Park et al.

(10) Patent No.: US 9,144,047 B2
(45) Date of Patent: Sep. 22, 2015

(54) METHODS, WIRELESS COMMUNICATION STATIONS, AND SYSTEM FOR TIME SYNCHRONIZATION AND DISCOVERY

(71) Applicants: Minyoung Park, Portland, OR (US); Emily H. Qi, Portland, OR (US); Oren Kaidar, Binyamina (IL); Adrian P Stephens, Cottenham (GB)

(72) Inventors: Minyoung Park, Portland, OR (US); Emily H. Qi, Portland, OR (US); Oren Kaidar, Binyamina (IL); Adrian P Stephens, Cottenham (GB)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/127,466

(22) PCT Filed: Jun. 26, 2013

(86) PCT No.: PCT/US2013/047963
§ 371 (c)(1),
(2) Date: Dec. 18, 2013

(87) PCT Pub. No.: WO2014/123566
PCT Pub. Date: Aug. 14, 2014

(65) Prior Publication Data
US 2014/0269670 A1    Sep. 18, 2014

Related U.S. Application Data

(60) Provisional application No. 61/763,429, filed on Feb. 11, 2013.

(51) Int. Cl.
*H04W 56/00* (2009.01)
*H04W 8/00* (2009.01)
*H04W 84/10* (2009.01)

(52) U.S. Cl.
CPC ............ *H04W 56/001* (2013.01); *H04W 8/005* (2013.01); *H04W 56/00* (2013.01); *H04W 84/10* (2013.01)

(58) Field of Classification Search
CPC ............ H04W 52/0219; H04W 48/12; H04W 52/028; H04W 56/009; H04W 72/0446; H04W 76/02; H04W 84/10; H04W 12/04; H04W 48/18; H04W 74/04; H04W 8/186; H04W 12/02; H04W 12/06; H04W 36/0055; H04W 48/14; H04W 4/02; H04W 52/02; H04W 52/0206; H04W 76/00; H04W 8/005; H04W 84/12; H04W 56/0015; H04W 56/00; H04W 56/002; H04W 48/16; H04W 52/0229; H04W 84/18; H04W 56/001; H04W 76/023; H04L 41/12; H04J 3/06
USPC ......... 370/338, 350, 311, 336, 254, 248, 329, 370/401, 431, 324, 328, 331, 503; 455/208, 455/502, 515, 265, 456.1, 456.5, 456.6, 455/41.2; 709/217, 248
See application file for complete search history.

(56) References Cited

U.S. PATENT DOCUMENTS

2009/0122783 A1    5/2009  Tanaka et al.
2009/0147768 A1*   6/2009  Ji et al. .......................... 370/350

(Continued)

FOREIGN PATENT DOCUMENTS

TW              201436619 A      9/2014
WO       WO-2012150750 A1      11/2012
WO       WO-2014123566 A1       8/2014

OTHER PUBLICATIONS

"International Application Serial No. PCT/US2013/047963, International Search Report mailed Nov. 14, 2013", 3 pgs.

(Continued)

*Primary Examiner* — Charles C Jiang
*Assistant Examiner* — Rose Clark
(74) *Attorney, Agent, or Firm* — Schwegman Lundberg & Woessner, P.A.

(57) ABSTRACT

Embodiments of a user station (STA) and methods for synchronizing with devices in a wireless communication network are generally described herein. In some embodiments, a STA receives a first beacon from a device in the first social network. The STA may synchronize to the first social network based on time synchronization information in the first beacon. The STA may transmit the time synchronization information of the first beacon to a second social network. A portion of a coverage area of the second social network may be outside a coverage area of the first social network.

18 Claims, 4 Drawing Sheets

(56) References Cited

U.S. PATENT DOCUMENTS

| | | |
|---|---|---|
| 2010/0226309 A1 | 9/2010 | Kasslin et al. |
| 2011/0090877 A1 | 4/2011 | Yuan |
| 2011/0170465 A1* | 7/2011 | Tavildar et al. ............... 370/311 |
| 2012/0044924 A1 | 2/2012 | Ji et al. |
| 2013/0044739 A1* | 2/2013 | Huang .......................... 370/338 |
| 2013/0204962 A1* | 8/2013 | Estevez et al. ................ 709/217 |
| 2014/0133469 A1* | 5/2014 | Lee et al. ...................... 370/336 |

OTHER PUBLICATIONS

"International Application Serial No. PCT/US2013/047963, Written Opinion mailed Nov. 14, 2013", 6 pgs.

* cited by examiner

METHODS, WIRELESS COMMUNICATION STATIONS, AND SYSTEM FOR TIME SYNCHRONIZATION AND DISCOVERY

CROSS-REFERENCE TO RELATED APPLICATIONS

This application is a U.S. National Stage Application under 35 U.S.C. 371 from International Application No. PCT/US2013/047963, filed Jun. 26, 2013, which claims priority to U.S. Provisional Patent Application No. 61/763,429, filed on Feb. 11, 2013, the content of which are incorporated herein by reference in their entirety.

TECHNICAL FIELD

Embodiments pertain to communication networks. Some embodiments pertain to Neighbor Awareness Networking (NAN) in accordance with Institute of Electrical and Electronics Engineers (IEEE) 802.11 family of standards.

BACKGROUND

Recently, there has been an upsurge in the use of residential Institute of Electrical and Electronics Engineers (IEEE) 802.11 wireless networks to provide a distribution medium between homes in a neighborhood. This wireless connectivity may be provided over so-called social channels, defined by Wi-Fi Direct. User devices may use time synchronization information of a wireless access point (AP) to receive services or discover other user devices in a social network served by the AP and communicating over the social channels. If no APs are nearby, or if no APs can provide services at a threshold level, a user device may join or form a social network comprised of other user devices, and this social network may have its own synchronization information.

A user device may wish to communicate with a device in a neighboring social network, and these communications may require the user device to have knowledge of synchronization information for the neighboring social network. Accordingly, there is a general need for methods for providing time synchronization and discovery-related information of a social network to neighboring AP-based and non-AP-based social networks so that user devices in neighboring social networks may discover each other and communicate over social channels.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
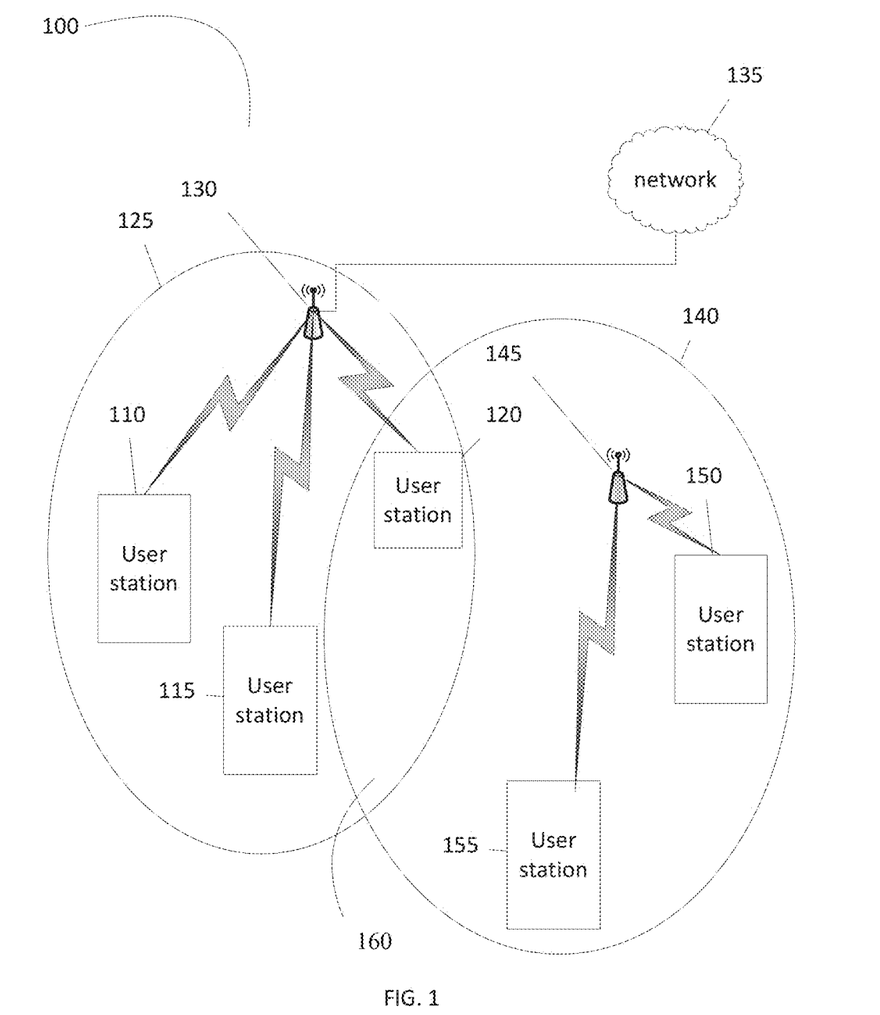
FIG. 1 illustrates a system in which example embodiments are implemented.

FIG. 1 illustrates a system 100 in which example embodiments may be implemented. The system 100 may include user wireless communication stations (STAs) 110, 115, and 120 in a range or coverage area 125 for hearing beacons transmitted by the STA 130. The user STAs 110, 115 and 120 may be, for example, laptop computers, smart phones, tablet computers, printers, machine-type devices such as smart meters, or any other wireless device with or without a user interface. The STA 130 may be a more stationary communication unit, although this is not a requirement. The STA 130 may be a wireless access point (AP) and the description below may refer to the STA 130 as the AP 130. The user STAs 110, 115 and 120 within the coverage area 125, and the AP 130 serving the coverage area 125, may form a time synchronization network. The description below may also refer to the time synchronization network as a "social network."

In an example, the user STAs 110, 115 and 120 may have a wireless connection through the AP 130 to the network 135. The network 135 may represent an interconnection of a number of networks. For instance, the network 135 may couple with a wide area network such as the Internet or an intranet. In some embodiments, the user STAs 110, 115 and 120 and the AP 130 may transmit and/or receive communications in accordance with specific communication standards, such as the IEEE 802.11 standards although user STAs 110, 115 and 120 and the AP 130 may also be suitable to transmit and/or receive communications in accordance with other techniques.

The system 100 may include a second range or service area 140 of an AP 145. User STAs 150 and 155 may be in the service area 140 of the AP 145. The user STAs 150 and 155 and the AP 145 may form a social network. In some embodiments, the user STAs 150 and 155 and the AP 145 may transmit and/or receive communications in accordance with specific communication standards, such as the IEEE 802.11 standards although user STAs 150 and 155 and the AP 145 may also be suitable to transmit and/or receive communications in accordance with other techniques.

While example embodiments may include two service areas, the system 100 may include more or fewer than two service areas. The system 100 may include no APs, one AP, or more than two APs. An AP may serve a service area or a mobile user STA may serve a service area. The service areas 125 and 140 may be located within a home or a residential neighborhood. The user STAs 110, 115, 120, 150 and 155 and the APs 125 and 145 may use residential IEEE 802.11 networks to implement services that are "neighborhood-aware," in accordance with Neighbor Awareness Networking (NAN) specifications and standards. The user STAs 110, 115, 120, 150 and 155 and the APs 125 and 145 may use social channels, defined in Wi-Fi Direct specifications, for NAN connectivity.

A user STA, for example the user STA 110, may synchronize with the AP 130 or another mobile user STA (not shown in FIG. 1), using information in a beacon signal transmitted by the AP 130 as described below with respect to FIG. 2-4, in order to receive services through the AP 130. A second user STA, for example the user STA 150, may synchronize with the AP 145 or another mobile user STA (not shown in FIG. 1), using information in a beacon signal transmitted by the AP 145 as described below with respect to FIG. 2-4, in order to receive services through the AP 145. One or more user STAs, for example the user STA 120, may be in an overlap area 160 that is within both the service area 125 and the service area 140. In example embodiments, the user STA 120 may synchronize with either of the APs 130 or 145 based on criteria that may include, for example, distance to the APs 130 or 145, signal strength of the APs 130 or 145, channel conditions, or other criteria.

A user STA, for example the user STA 110 synchronized with the AP 130, may desire to communicate with a user STA, for example the user STA 150 synchronized to the AP 145. Example embodiments may allow user STAs synchronized to different APs or to different user STAs to discover and communicate with each other over social channels.

Figure 2:
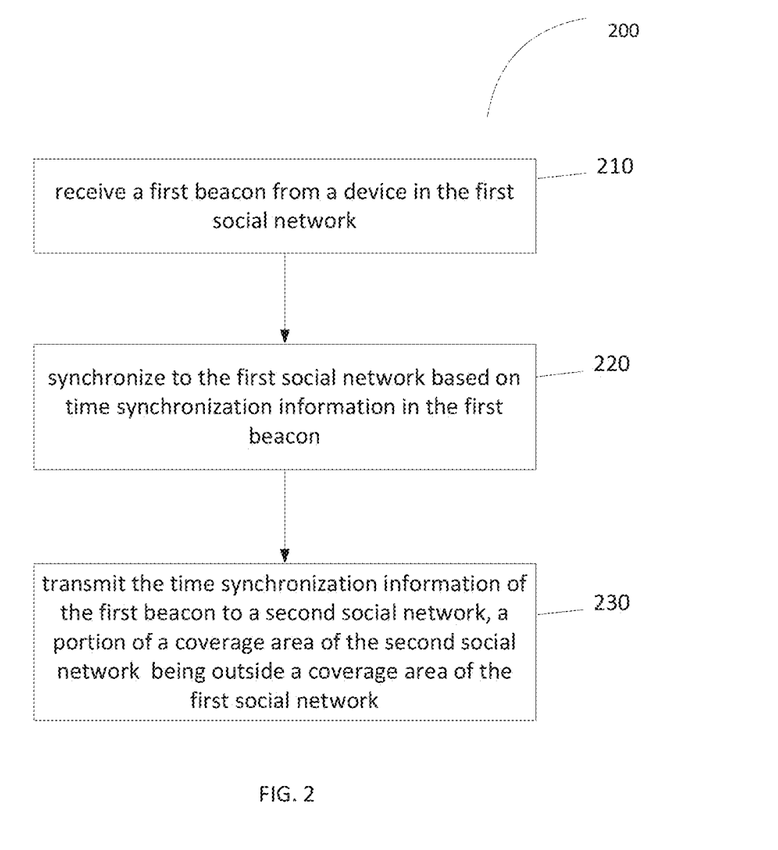
FIG. 2 is a flow diagram of a procedure performed by a user station (STA) for synchronizing with devices in a wireless communication network, in accordance with some embodiments.

FIG. 2 illustrates a method 200, performed by the user STA 120, for operating in a first social network, for example in the social network within the coverage area 125 served by the AP 130.

Referring to FIG. 2, in operation 210, the user STA 120 may receive a first beacon from a device in the first social network. In an example embodiment, the user STA 120 may receive the first beacon from the AP 130 (FIG. 1). Communications in the first social network may occur over a Wi-Fi Peer-to-Peer (P2P) social channel.

In operation 220, the user STA 120 may synchronize to the first social network based on time synchronization information in the first beacon. The time synchronization information of the first beacon may include time stamp information for a synchronization point of the first social network. The first beacon may include one or more information elements (IE) containing discovery information for the first social network. The discovery information may include information related to the discovery window of the first social network, information related to services of the first social network, an identifier or address of a device in the first social network, information concerning the identity of applications available in the first social network, or other information that may assist in discovery of devices or other communications.

In operation 230, the user STA 120 may transmit the time synchronization information of the first beacon to a second social network. For example, the user STA 120 may transmit the time synchronization information of the first beacon to a user STA 150 within the second social network within the coverage area 140 served by the AP 145 (FIG. 1). As shown in FIG. 1, in an example embodiment, the coverage area 140 may partially overlap with the coverage area 125 of the first social network in the overlap area 160.

The user STA 120 may transmit time synchronization information of the first beacon by first detecting a second beacon transmitted from the second social network and extracting discovery information from the second beacon to determine a discovery window of the second social network. The discovery information may be included in the second beacon as an information element (IE). The user STA 120 may transmit the time synchronization information of the first beacon during the discovery window of the second social network.

The user STA 120 may transmit discovery information for the first social network to devices in the second social network within IEs of the first beacon. The discovery information may indicate when the user STA 120 that transmitted the first beacon is available to receive responses. Devices in the second social network may use the time synchronization information and discovery information received in the first beacon to discover devices that are synchronized to the first social network. For example, user STAs 150 and 155 in the second social network may use the information in the first beacon to discover user STAs 110, 115 and 120 that are synchronized to the first social network in the coverage area 125 served by the AP 130.

The user STA 120 may discover devices of the second social network using the discovery information included in one or more IEs extracted from the second beacon. The user STA 120 may communicate with discovered devices of the second social network. The user STA 120 may synchronize to the second social network, using time synchronization information extracted from the second beacon, responsive to determining that channel conditions in the first social network have deteriorated below a threshold. For example, the user STA 120 may synchronize to the second social network served by the AP 145 if a received signal strength indication (RSSI) corresponding to a beacon received from the AP 125 to which the STA 120 is synchronized is lower than the RSSI values of beacons received from the AP 145. As a further example, the user STA 120 may synchronize to the second social network based on the frequency with which discovery windows are available in the second social network, or based on the identity or number of applications or devices available in the second social network.

The user STA 120 may transmit the time synchronization information of the second beacon to devices in the first social network. For example, the user STA 120 may transmit the time synchronization information of the second beacon, transmitted by the AP 145, to other user STAs 110 and 115 in the coverage area 125 served by the AP 130.

The user STA 120 may receive more than one beacon signal. The user STA 120 may select the beacon signal of the AP with which to synchronize based on, for example, a time stamp associated with the beacon signal, or any other criterion.

The user STA 120 may receive no beacon signals. If the user STA 120 receives no beacon signals, the user STA 120 may transmit a beacon signal with time synchronization and discovery information. Other user STAs, APs, or devices within a range of the user STA 120 may synchronize with the user STA 120 using the IEs and time synchronization information in the beacon signal transmitted by the user STA 120. The other user STAs, APs, or devices may relay time synchronization and discovery information, transmitted by the user STA 120, to other devices within their social network or networks.

Figure 3:
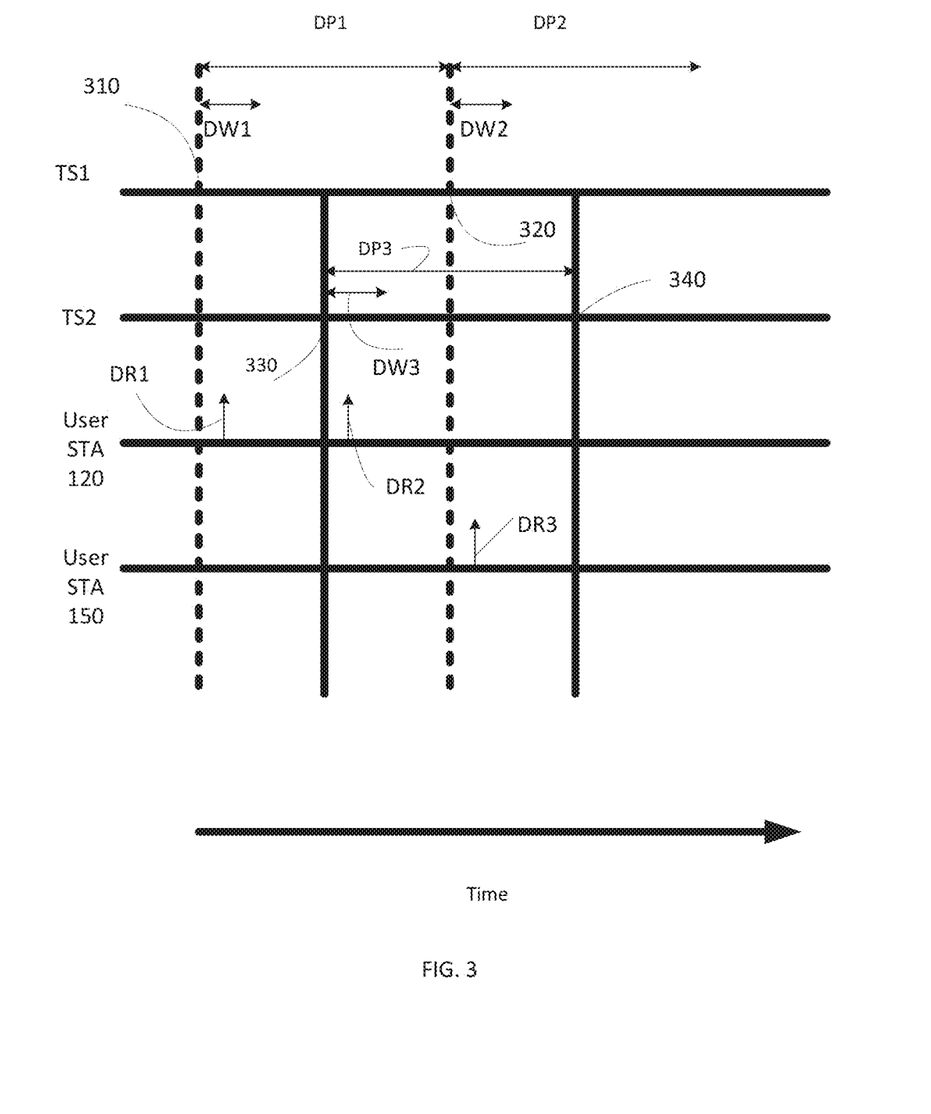
FIG. 3 is a timing diagram in accordance with example embodiments.

FIG. 3 is a timing diagram in accordance with example embodiments. TS1 may represent time synchronization corresponding to a first AP 130 (FIG. 1) serving a first social network in a coverage area 125 (FIG. 1). TS2 may represent time synchronization corresponding to a second AP 145 (FIG. 1) serving a second social network in a coverage area 140 (FIG. 1). In an example embodiment, the user STA 120 may derive the time synchronization point 310 from a beacon signal transmitted by the AP 130 (FIG. 1). However, example embodiments are not limited thereto, and the user STA 120 may derive the time synchronization point 310 from a beacon signal transmitted by a user STA, another AP, or any other device.

A discovery period DP1 may start at the synchronization point 310 and last until a second synchronization point 320. A discovery window DW1 may start at the synchronization point 310 and last for an amount of time, for example 20 milliseconds. However, the discovery window DW1 may start at any point in the discovery period DP1 and the discovery window DW1 may last for any duration. Information elements (IEs) of the beacon signal transmitted by the AP 125 may define parameters for the discovery window DW1.

The user STA 120 may transmit a discovery request DR1 during the discovery window DW1. The discovery request DR1 may be configured to allow the User STA 120 to discover devices or services within the service area 125 served by the AP 130.

A discovery window DW2 may start at the same or similar point in the second discovery period DP2. While only two discovery periods DP1 and DP2 are shown, discovery periods may continue for any amount of discovery time, or for as long as the associated AP or other device is transmitting beacon signals on social channels in the social network. The user STA 120 may not remain in an awake mode, for example the user STA 120 may not remain capable of receiving or transmitting messages, during every discovery window over the discovery time. A user STA may choose to stay awake during one discovery window, no discovery windows, or some subset of discovery windows over a discovery time, where a discovery time includes a plurality of discovery periods. The user STA may determine a number of discovery windows in which it will remain awake based on power-saving needs, latency needs, or other criteria.

A second AP, for example the AP 145 (FIG. 1), may transmit a second beacon signal including time stamp information indicating synchronization points 330 and 340. A discovery period DP3 may start at the synchronization point 330 and last until a second synchronization point 340. A discovery window DW3 may start at the synchronization point 330 and last for an amount of time, for example 20 milliseconds. However, the discovery window DW3 may start at any point in the discovery period DP3 and the discovery window DW3 may last for any duration.

If the user STA 120 is able to receive the second beacon signal from the second AP 145, the user STA 120 may derive the synchronization point 330 or 340 from the second beacon signal. The user STA 120 may transmit a beacon, including IEs with discovery information of the first social network, during a discovery window DW3 of the second social network. The user STA 120 may transmit a discovery request DR2 during the discovery window DW3 to discover devices in the second social network within the coverage area 140 served by the second AP 145. A user STA, for example the user STA 150 synchronized to the AP 145, may use the time synchronization information and discovery information, extracted from the beacon of the first social network that was relayed by the user STA 120, to discover devices that are synchronized to the first social network. The user STA 150 may transmit a discovery request DR3 during a discovery window DW2, extracted from an IE of the beacon relayed by the user STA 120, to discover devices operating in the first social network.

Figure 4:
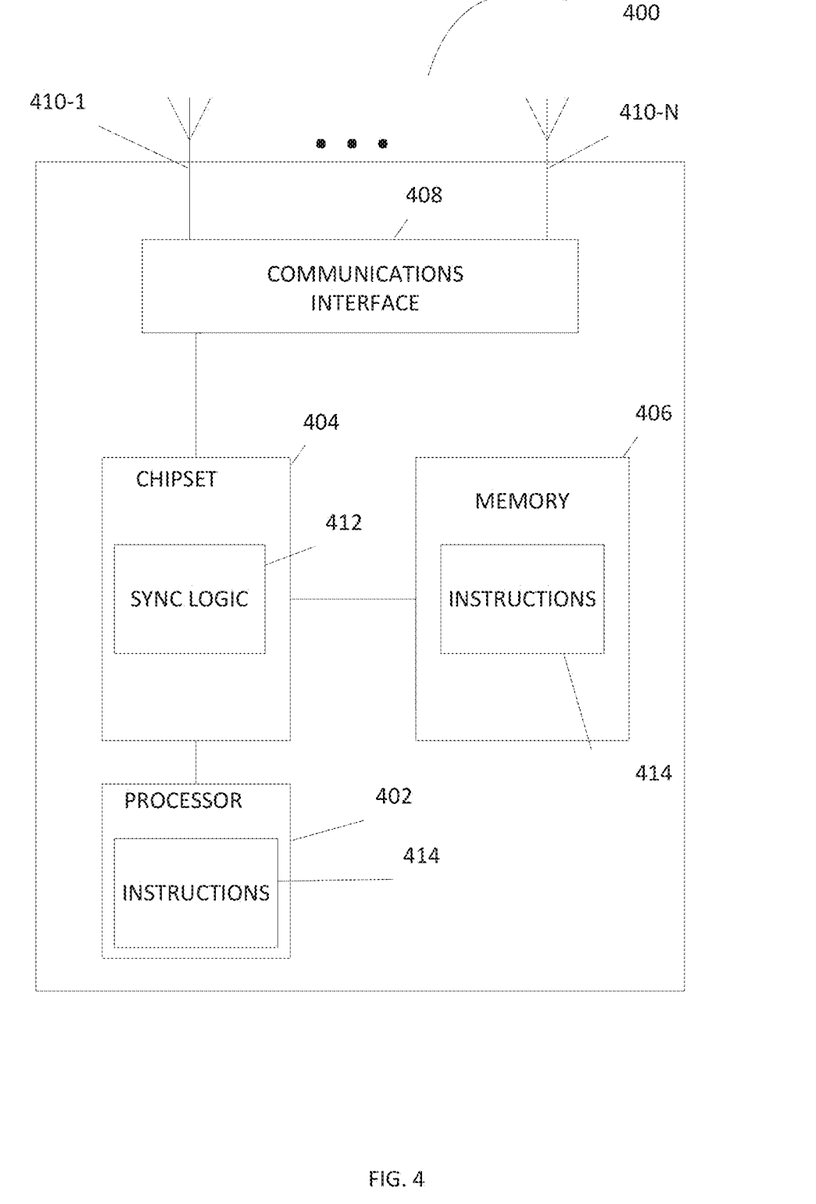
FIG. 4 illustrates a functional block diagram of a communication station (STA), in accordance with some embodiments.

FIG. 4 illustrates a functional block diagram of a STA 400, in accordance with some embodiments. The STA 400 may be suitable as a user STA 110, 115, 120, 150 or 155 (FIG. 1). The STA 400 may support methods for operating in a wireless communication network, in accordance with embodiments. The STA 400 may include a processor 402, which uses a chipset 404 to access on-chip state memory 406, as well as a communications interface 408. In one embodiment the memory 406 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

In at least one embodiment, the communications interface 408 is, for example, a wireless Physical Layer (PHY), which operates according to a multiple input/multiple output (MIMO) operation. The communications interface 408 may receive a first beacon transmitted on a social channel by a device in a first social network. The social channel may be a Wi-Fi Peer-to-Peer (P2P) channel.

The chipset 404 may incorporate therein Synchronization Logic 412 to, for example, transmit beacons for synchronization. In an embodiment, the chipset 404 provides MAC layer functionality. The chipset 404 may configure the first beacon for transmission to a second social network such that the first beacon includes at least the time synchronization information in the first beacon. A portion of a coverage area of the second social network being outside a coverage area of the first social network.

Embodiments may be implemented in one or a combination of hardware, firmware and software. Embodiments may also be implemented as instructions 414 stored on a non-transitory computer-readable storage device, which may be read and executed by at least one processor 402 to perform the operations described herein.

The processor 402 may be arranged to synchronize to the first social network based on time synchronization information in the first beacon. The processor 402 may be arranged to extract, from the first beacon, time stamp information for a synchronization point of the first social network. The processor 402 may further extract, from the first beacon, an information element (IE) with discovery information of the first social network. Discovery information may be as described above with respect to FIG. 2.

The processor 402 may be arranged to extract discovery information from a second beacon transmitted from the second social network, to determine a discovery window of the second social network, the discovery information being included in the second beacon as an information element (IE). The processor 402 may be arranged to discover devices of the second social network using the discovery information included in the IE extracted from the second beacon and to communicate with discovered devices of the second social network. The chipset 404 may be arranged to configure the first beacon for transmission during the discovery window of the second social network. The chipset 404 may be arranged to configure the time synchronization information of the second beacon for transmission to devices in the first social network.

The processor 402 may be arranged to synchronize to the second social network, using the time synchronization information of the second beacon, responsive to determining that channel conditions in the first social network have deteriorated below a threshold. The processor 402 may also be arranged to synchronize to the second social network based on other criteria described above with respect to FIG. 2.

In some embodiments, the instructions 414 are stored on the processor 402 or the memory 406 such that the processor 402 and the memory 406 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The instructions 414, when executed on the STA 400, may cause the STA 400 to receive a first beacon, over a Wi-Fi Peer-to-Peer (P2P) social channel, from a device in a first social network. The instructions 414, when executed on the STA 400, may cause the STA 400 to synchronize to the first social network based on time synchronization information in the first beacon. The instructions 414, when executed on the STA 400, may cause the STA 400 to transmit the time synchronization information of the first beacon to a second social network, a portion of a coverage area of the second social network being outside a coverage area of the first social network.

Although the STA 400 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements of the STA 400 may refer to one or more processes operating on one or more processing elements.

The STA 400 may include multiple transmit and receive antennas 410-1 through 410-N, where N is a natural number. Antennas 410-1 through 410-N may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 410-1 through 410-N may be effectively separated to take advantage of spatial diversity and the different channel characteristics that may result between each of antennas 410-1 through 410-N. In some MIMO embodiments, antennas 410-1 through 410-N may be separated by up to ¹⁄₁₀ of a wavelength or more.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method, performed by a user station (STA), for operating in a first social network, the method comprising:
    receiving a first beacon from a device in the first social network;
    synchronizing to the first social network based on time synchronization information in the first beacon;
    transmitting the time synchronization information of the first beacon to a second social network, a portion of a coverage area of the second social network being outside a coverage area of the first social network;
    detecting a second beacon transmitted from the second social network;
    extracting discovery information from the second beacon to determine a discovery window of the second social network, the discovery information being included in the second beacon as an information element (IE);
    discovering devices of the second social network, subsequent to transmitting the time synchronization information of the first beacon, using the discovery information included in the IE extracted from the second beacon; and
    communicating with discovered devices of the second social network using the discovery information of the second beacon.

2. The method of claim 1, wherein transmitting the time synchronization information of the first beacon comprises:
    transmitting the time synchronization information of the first beacon during the discovery window of the second social network.

3. The method of claim 2, further comprising:
    synchronizing to the second social network, using time synchronization information extracted from the second beacon, responsive to determining that channel conditions in the first social network have deteriorated below a threshold.

4. The method of claim 2, further comprising:
    transmitting the time synchronization information of the second beacon to devices in the first social network.

5. The method of claim 1, wherein communications in the first social network occur over a Wi-Fi Peer-to-Peer (P2P) social channel.

6. The method of claim 1, wherein the time synchronization information of the first beacon includes time stamp information for a synchronization point of the first social network.

7. The method of claim 6, wherein the first beacon includes an information element (IE) containing discovery information for the first social network.

8. The method of claim 7, wherein the discovery information includes a discovery window of the first social network, services of the first social network, or an identifier for a device in the first social network.

9. A wireless communication station (STA) comprising:
    physical layer (PHY) circuitry to receive a first beacon transmitted on a social channel by a device in a first social network; and
    one or more processors to
        synchronize to the first social network based on time synchronization information in the first beacon, and
        extract, from the first beacon,
            time stamp information for a synchronization point of the first social network, and
            an information element (IE) with discovery information of the first social network; and
    a medium access control (MAC) layer to configure the first beacon for transmission to a second social network such that the first beacon includes at least the time synchronization information in the first beacon, a portion of a coverage area of the second social network being outside a coverage area of the first social network, wherein the one or more processors are further configured to:
    extract discovery information from a second beacon transmitted from the second social network to determine a discovery window of the second social network, the discovery information being included in the second beacon as an information element (IE); and
    discover devices of the second social network, subsequent to transmitting time synchronization information of the first beacon, using the discovery information included in the IE extracted from the second beacon; and wherein
    the MAC layer is further configured to communicate with discovered devices of the second social network using the discovery information of the second beacon.

10. The STA of claim 9, wherein
    the MAC layer is further arranged to configure the first beacon for transmission during the discovery window of the second social network.

11. The STA of claim 10, wherein the one or more processors are further arranged to:
    synchronize to the second social network, using the time synchronization information of the second beacon, responsive to determining that channel conditions in the first social network have deteriorated below a threshold.

12. The STA of claim 10, wherein the MAC is further arranged to:
configure the time synchronization information of the second beacon for transmission to devices in the first social network.

13. The STA of claim 9, wherein the social channel is a Wi-Fi Peer-to-Peer (P2P) channel.

14. A system comprising:
an antenna arranged to receive a first beacon transmitted on a social channel in a first social network;
a memory to store
a list of social channels, the social channels being Wi-Fi Peer-to-Peer (P2P) channels, and
information extracted from the first beacon; and
a processor arranged to
synchronize to the first social network based on time synchronization information in the first beacon,
extract information from the first beacon, the information including time stamp information for a synchronization point for the first social network and discovery information for the first social network, the discovery information being included in the first beacon as an information element (IE)
configure a message, including information extracted from the first beacon, for transmission to a second social network, a portion of a coverage area of the second social network being outside a coverage area of the first social network,
extract discovery information from a second beacon transmitted from the second social network to determine a discovery window of the second social network, the discovery information being included in the second beacon as an IE,
discover devices of the second social network, subsequent to transmitting time synchronization information of the first beacon, using the discovery information included in the IE extracted from the second beacon, and
communicate with discovered devices of the second social network using the discovery information of the second beacon.

15. The system of claim 14, wherein the processor is further arranged to
transmit time synchronization information of the first beacon during the discovery window of the second social network.

16. A non-transitory computer-readable medium comprising instructions that, when executed on a user station (STA) cause the STA to:
receive a first beacon, over a Wi-Fi Peer-to-Peer (P2P) social channel, from a device in a first social network;
synchronize to the first social network based on time synchronization information in the first beacon; and
transmit the time synchronization information of the first beacon to a second social network, a portion of a coverage area of the second social network being outside a coverage area of the first social network,
extract discovery information from a second beacon transmitted from the second social network to determine a discovery window of the second social network, the discovery information being included in the second beacon as an IE,
discover devices of the second social network, subsequent to transmitting time synchronization information of the first beacon, using the discovery information included in the IE extracted from the second beacon, and
communicate with discovered devices of the second social network using the discovery information of the second beacon.

17. The computer-readable medium of claim 16, wherein the instructions further cause the STA to:
transmit the time synchronization information of the first beacon during the discovery window of the second social network; and
transmit time synchronization information of the second beacon to devices in the first social network.

18. The computer-readable medium of claim 17, wherein the instructions further cause the STA to:
synchronize to the second social network, using the time synchronization information of the second beacon, responsive to determining that channel conditions in the first social network have deteriorated below a threshold.

\* \* \* \* \*